(12) United States Patent
Barragan et al.

(10) Patent No.: US 12,233,917 B2
(45) Date of Patent: Feb. 25, 2025

(54) VEHICULAR AUTONOMOUS CONTROL SYSTEM BASED ON LEARNED AND PREDICTED VEHICLE MOTION

(71) Applicant: Magna Electronics Inc., Auburn Hills, MI (US)

(72) Inventors: Patrick R. Barragan, Cambridge, MA (US); Charles A. Richter, Cambridge, MA (US)

(73) Assignee: Magna Electronics Inc., Auburn Hills, MI (US)

( * ) Notice: Subject to any disclaimer, the term of this patent is extended or adjusted under 35 U.S.C. 154(b) by 226 days.

(21) Appl. No.: 18/155,088

(22) Filed: Jan. 17, 2023

(65) Prior Publication Data

US 2023/0227073 A1    Jul. 20, 2023

Related U.S. Application Data

(60) Provisional application No. 63/266,879, filed on Jan. 18, 2022.

(51) Int. Cl.
*B60W 60/00* (2020.01)
*G06V 10/82* (2022.01)
*G06V 20/58* (2022.01)

(52) U.S. Cl.
CPC ......... *B60W 60/0027* (2020.02); *G06V 10/82* (2022.01); *G06V 20/58* (2022.01); *B60W 2420/403* (2013.01); *B60W 2554/40* (2020.02)

(58) Field of Classification Search
CPC ....... B60W 60/0027; B60W 2420/403; B60W 2554/40; B60W 2552/00; B60W 2552/30; B60W 60/00; G06V 10/82; G06V 20/58; G06F 18/2321

USPC ........................................................ 701/23
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 7,038,577 B2 | 5/2006 | Pawlicki et al. |
| 7,720,580 B2 | 5/2010 | Higgins-Luthman |
| 7,855,755 B2 | 12/2010 | Weller et al. |
| 9,761,142 B2 | 9/2017 | Pflug |
| 10,071,687 B2 | 9/2018 | Ihlenburg et al. |
| 10,099,614 B2 | 10/2018 | Diessner |
| 10,286,843 B2 * | 5/2019 | Gieseke ................. G06F 3/012 |

(Continued)

*Primary Examiner* — Shardul D Patel
(74) *Attorney, Agent, or Firm* — HONIGMAN LLP

(57) ABSTRACT

A vehicular vision system includes a forward-viewing camera disposed at a vehicle, and an electronic control unit (ECU). Electronic circuitry of the ECU includes an image processor for processing image data captured by the forward-viewing camera. The vehicular vision system, responsive to processing by the image processor of image data captured by the forward-viewing camera, detects a target vehicle. The vehicular vision system, responsive to detecting the target vehicle, predicts, using a machine learning model, a probability for each action of a set of actions, with each action in the set of actions representing a potential action by the target vehicle. The machine learning model includes at least one discrete latent variable and at least one continuous latent variable. The vehicular vision system, responsive to predicting the probability for each action, autonomously controls the equipped vehicle.

22 Claims, 7 Drawing Sheets

(56) References Cited

U.S. PATENT DOCUMENTS

| | | | |
|---|---|---|---|
| 10,875,453 B2 * | 12/2020 | Gieseke | ............... G01C 21/365 |
| 11,453,393 B2 | 9/2022 | Wienecke et al. | |
| 11,560,092 B2 * | 1/2023 | Gieseke | ................. G06F 3/017 |
| 11,827,152 B2 * | 11/2023 | Gieseke | ............ G01C 21/3679 |
| 12,093,455 B2 * | 9/2024 | Gieseke | ............... G01C 21/365 |
| 2016/0185293 A1 * | 6/2016 | Gieseke | ................. G06F 3/005 |
| | | | 348/115 |

* cited by examiner

VEHICULAR AUTONOMOUS CONTROL SYSTEM BASED ON LEARNED AND PREDICTED VEHICLE MOTION

CROSS REFERENCE TO RELATED APPLICATION

The present application claims the filing benefits of U.S. provisional application Ser. No. 63/266,879, filed Jan. 18, 2022, which is hereby incorporated herein by reference in its entirety.

FIELD OF THE INVENTION

The present invention relates generally to a vehicular control system for a vehicle and, more particularly, to a vehicular control system that utilizes one or more sensors at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A driving assistance system or vision system or autonomous driving system for a vehicle utilizes a plurality of sensors, including one or more cameras that capture image data representative of images exterior of the vehicle and/or one or more radar sensors that capture sensor data. The camera (such as a forward-viewing camera that views at least forward of the vehicle, and such as a forward-viewing camera disposed at an in-cabin side of a windshield of the vehicle and viewing forward through the windshield) includes a CMOS imaging array that may include at least one million photosensors arranged in rows and columns. The system includes an electronic control unit (ECU) with electronic circuitry and associated software. The electronic circuitry of the ECU includes an image processor for processing image data captured by the camera to detect presence of objects in the field of view of the camera. The vehicular vision system, responsive to processing by the image processor of image data captured by the camera, detects a target vehicle. The vehicular vision system, responsive to detecting the target vehicle, predicts, using a machine learning model, a probability for each action of a set of actions, wherein each action in the set of actions represents a potential act by the target vehicle. The machine learning model includes at least one discrete latent variable and at least one continuous latent variable. The vehicular vision system, responsive to predicting the probability for each action, autonomously controls the vehicle.

These and other objects, advantages, purposes and features of the present invention will become apparent upon review of the following specification in conjunction with the drawings.

DESCRIPTION OF THE PREFERRED EMBODIMENTS

A vehicular vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
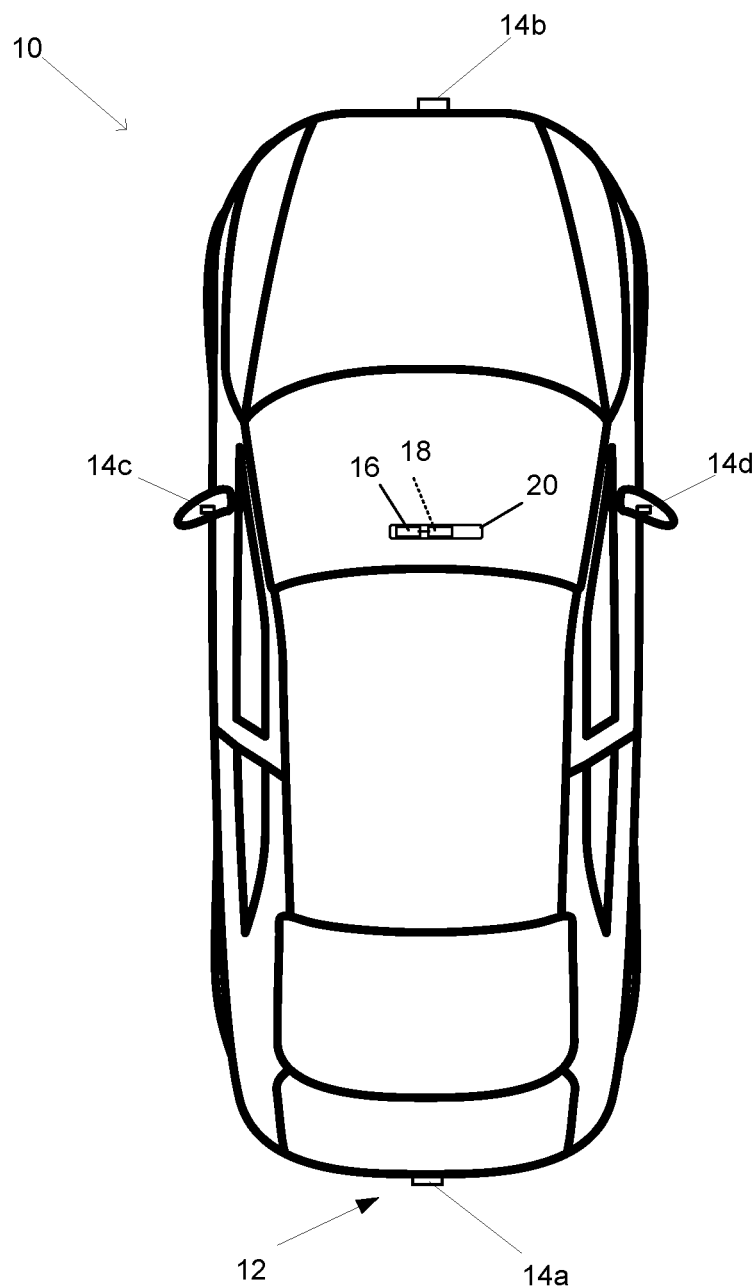
FIG. 1 is a plan view of a vehicle with a vision system that incorporates cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at an in-cabin side of the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The system may also or otherwise utilize other sensors, such as a plurality of radar sensors and/or a plurality of lidar sensors that capture sensor data. The data transfer or signal communication from the camera or sensor to the ECU may comprise any suitable data or communication link, such as a vehicle network bus or the like of the equipped vehicle.

A central challenge in robotics and artificial intelligence is to develop discrete representations that can translate the high-dimensional continuous spaces of real-world sensor data and robot configuration into forms that are compatible with algorithms for abstract reasoning, such as search and logical or probabilistic inference. Although representation learning has been studied extensively in the machine learning literature, these methods have not been widely adopted in the recent literature of behavior prediction and motion forecasting in the autonomous vehicle domain. One possible explanation is that most of the essential components of a self-driving vehicle (SDV) system can be engineered or learned without the use of a discrete set of representative actions. For example, a motion forecasting model that generates predicted future trajectories for other vehicles on the road can be fed directly into the SDV planning system to avoid collision without those predicted trajectories necessarily representing particular distinct maneuvers.

Nevertheless, there are important cases in an autonomous vehicle system in which it would be useful to describe and predict behavior in terms of a representative discrete action set. For example, communicating intent or receiving instruction from a user would require a relatively compact set of human-understandable and meaningfully distinct action choices, perhaps with a semantic label attached. Similarly, right-of-way conventions and rules of the road are understood in terms of a relatively parsimonious set of representative actions, and evaluating a continuous-valued trajectory with respect to those rules would require a way to classify or describe that trajectory as a member of that action set.

At the same time, there is enormous variability in the behaviors of drivers, cyclists, and pedestrians in real-world scenarios. There is also great diversity in the design of roads, intersections, parking lots, sidewalks, and other environments where an autonomous system must understand and predict movements of other agents. There is a substantial challenge in developing a representative discrete action set under these highly variable conditions. For example, if a vehicle is following a road that curves gently to the left, an autonomous system must determine whether that constitutes a "go straight" or "turn left" maneuver. It is likely that manually defining maneuver categories and classifiers for those categories will quickly become untenable and therefore the categories themselves should arise automatically from the data with no manually generated labels.

Implementations herein provide a system that learns a representative discrete set of actions that can be used to describe and predict intent as well as to forecast continuous-valued trajectories. The system provides a means of answering queries such as "What is the probability of taking action i in this scenario?" as well as "What would the probability distribution of action i look like if executed in this scenario?" Moreover, the system estimates full distributional information, since uncertainty information is essential to safe and effective autonomous vehicle operation. To this end, the system includes a unified generative model based on methods that combine variational inference and unsupervised clustering. The model assumes that trajectories are explained by both discrete and continuous underlying latent variables and that those underlying factors are determined by (or can be inferred from) an input scenario.

Techniques for behavior prediction and motion forecasting have proliferated with a variety of highly successful methods, fueled by the need for prediction methods in autonomous driving systems, rapidly evolving machine learning methods, and publicly available datasets based on the accurate perception systems of modern autonomous vehicles (AVs). Motion forecasting is particularly well-suited to supervised learning because labels are effectively provided by simply tracking obstacles over time, without the need for human annotation. A common solution is to describe a prediction scenario or context as a rasterized bird's-eye-view (BEV) image containing semantic features of the road (e.g., lane lines, traffic signals, crosswalks, etc.) along with a number of channels containing past states of the target(s) of interest and other agents in the scene. This scenario can then be fed as input to a machine learning model such as a convolutional neural network (CNN) to extract features and predict the future trajectory of the target(s) of interest. Others rasterize the map input while also providing raw sensor data. Although most methods predict individual agent motions independent of other agents, some explicitly reason about future interaction in their predictions. Implementations herein primarily focus on machine learning models such as CNN-based models that predict multimodal trajectory outputs for a single target vehicle, however it is understood there are many other alternatives involving recurrent and graph neural networks that may be employed as well. The target vehicle or object may be another vehicle forward of the equipped vehicle, such as a leading vehicle or trailing vehicle traveling along the same road ahead of the equipped vehicle, or such as a cross-traffic vehicle traveling along another road that intersects the road along which the equipped vehicle is traveling, or such as another vehicle in a side traffic lane ahead of or sideward of or rearward of the equipped vehicle, or such as a pedestrian or bicyclist or the like present at or near or approaching the front, rear or side of the equipped vehicle.

While it is possible to frame the motion prediction problem as a unimodal regression problem, these solutions are not always useful in practice since vehicles on the road can take a variety of different actions in a given scenario, and a unimodal estimate will tend to average these. Motion prediction can also be framed as classification over a set of possible trajectories, naturally enabling multimodal behavior, sometimes with an extra regression step to estimate an offset from the selected "anchor" trajectory. These trajectory sets can be generated in various ways, including using samples (or cluster means) from the training dataset or generating them based on known kinematics. These methods may suffice for producing accurate predictions. However, they may not be ideal representative action sets because they may contain too many anchors for an efficient description, they may contain many redundant anchors, and/or they may not be optimized to accurately model the true data distribution. Implementations herein overcome these problems by jointly optimizing the action set and the motion prediction in a unified probabilistic model. These implementations describe representative ("anchor") actions as distributions in a continuous latent space that are learned by maximizing data likelihood under the model instead of point estimates.

Some conventional methods have aimed to learn a discrete intent or behavior, sometimes along with a motion prediction. Many of these methods assume a set of manually-defined categories for simple maneuvers such as "go straight" or "turn left." However, manually defining maneuvers categories and labeling data presents a considerable challenge given the variability of road geometries and subtlety of driving behaviors, and there are significant benefits to having the maneuver categories arise automatically from the data. Some methods do not manually define behavior categories but instead limit their scope to very specific road structures such as 3-way and 4-way intersections or limit their evaluation to very specific scenarios like highway driving. These methods lack the full diversity of vehicle maneuvers. In contrast, implementations herein make no assumptions about the roadway structure or vehicle behaviors so that the action representation the model learns will be as general and representative as possible.

To capture variability in vehicle or pedestrian behavior, some methods have utilized latent variable models such as (conditional) variational autoencoders ((C)VAEs), which are often optimized with the tools of variational inference. A discrete latent variable is often used to capture multimodality, enabling a selection among different behaviors, while a continuous latent variable can be used to capture general variability in a distribution of actions. Implementations herein differ from these in that the system utilizes both discrete and continuous latent variables. The discrete latent variable captures multimodality in the space of behaviors, while the continuous latent variable allows diversity within each behavior, so that actions can be adapted and shaped to the specific context as appropriate. Some techniques use a VAE encoding into a continuous latent space to classify different manually-defined maneuver categories. However, these techniques do not also use a discrete latent variable to explicitly identify and cluster these categories as described herein. While some latent variable models (such as the one described herein) can produce full distributional information in a single deterministic evaluation, it may be useful to sample from these models, and recently methods have been developed to draw diverse samples that represent distinct underlying modes (and therefore distinct motion behaviors) modeled by CVAEs and generative adversarial networks (GANs).

Self-supervised identification of a representative action set can be viewed as a clustering problem, and implementations herein combine clustering with deep learning and variational inference. Since the introduction of variational autoencoders, many subsequent techniques have replaced the unimodal Gaussian latent space prior with more complex distributions. The particular latent space distribution of particular use in the system described herein is the Gaussian Mixture Model (GMM), which has been used to facilitate deep unsupervised clustering and is often used to learn representations of data like handwritten digits (e.g., the Modified National Institute of Standards and Technology (MNIST) dataset), where elements have a discrete identity as well as continuous-valued style variation. With a GMM prior, a (C)VAE effectively learns Gaussian clusters in the continuous latent space, where the cluster means and variances as well as the shape of the latent space itself are jointly learned and the distribution over the discrete latent variable indicates cluster membership. Implementations herein use this approach to jointly learn a representative set of actions that are optimized to maximize the likelihood of the data as well as the distribution that predicts action probability given the scenario (map and state history). Additionally, implementations herein extend this model to learn a posterior distribution over the continuous latent variables given action choice and scenario, which enables the system to make accurate motion predictions conditioned on action choice that are appropriate to the road geometry and agent state in the scenario.

Implementations herein jointly learn a set of representative actions and include a model that predicts the discrete probability of each action in a given scenario. As used herein, an action is not defined as a single fixed trajectory but is instead defined as a continuous distribution of similar trajectories that might serve the same functional purpose across a range of different scenarios and map geometries. Therefore, both discrete and continuous elements of variation are modeled. However, there are no assumptions of prior knowledge of manually-defined behavior categories or action shapes, and instead, both the discrete action categories and the associated continuous-valued distributions over trajectories arise naturally from the data. The model learns a representative set of actions in a self-supervised manner, and the model is extended to make accurate motion predictions conditioned on a given scenario.

Figure 2:
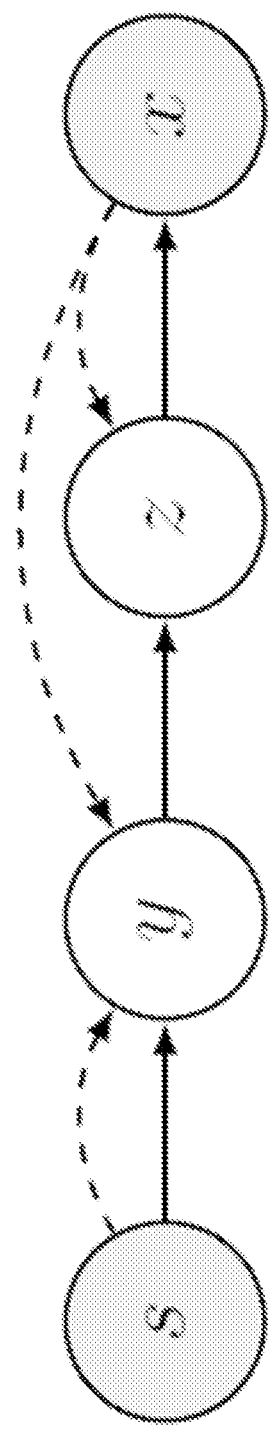
FIG. 2 is a schematic view of a graphical model of observed variables and latent variables.

Assume a dataset of trajectory-scenario pairs $(X,S)=((x_1, s_1), \ldots, (x_N, s_N))$, where $x_i$ is a vector of future vehicle position coordinates for the target vehicle of interest in sample i and $s_i$ is a scenario (or context) represented as multi-channel rasterization of the map and past states of the target vehicle as well as past states of other agents in the scenario. To capture both discrete and continuous elements of variation in driving behaviors, the system includes a latent variable model using both discrete and continuous latent variables. The system may be modeled according to the graphical model illustrated in FIG. 2. FIG. 2 illustrates a graphical model in which observed variables s and x are shaded while latent variables y and z are not shaded. Solid arrows indicate a generative model while dashed arrows indicate a variational (or recognition) model. In this model, x and s represent the trajectory and scenario, respectively. The variable $y \in 1, \ldots, K$ is a discrete latent variable, and the variable $z \in \mathbb{R}^D$ is a continuous latent variable. The latent variables y and z together constitute a Gaussian mixture model (GMM) where the value of y selects a particular component of the GMM and each component is represented with a mean and covariance. The objective is to maximize $\ln p(X|S)$ over the parameters of this model, thereby learning a set of GMM components that decode via $p(x|z)$ to action distributions as well as a predictor $p(y|s)$ of action probability.

Since direct optimization of this model is difficult, variational inference is used to specify a variational model $q(y,z|x,s)$ to approximate the distribution over latent variables. It may be assumed that the generative and variational models factorize as follows:

$$p(x,y,z|s)=p(y|s)p(z|y)p(x|z) \quad (1)$$

$$q(y,z|x,z)=q(y|x,s)q(z|x) \quad (2)$$

This factorization gives rise to a relationship between z and x that closely resembles a conventional variational autoencoder, where $q(z|x)$ acts as an encoder into a continuous-valued latent space and $p(x|z)$ acts as a decoder. However, unlike a conventional VAE, this latent space prior comprises K Gaussians whose parameters are optimized to capture the modes of the encoded data. Learning in this model simultaneously shapes the latent space z and clusters data in that space. These clusters, when decoded to the trajectory space x, define the learned action set.

Following a common decomposition in variational inference, the log likelihood for a single element of the dataset can be written as:

$$\ln p(x|s) = \mathcal{L}(q) + D_{KL}(q\|p) \quad (3)$$

where:

$$\mathcal{L}(q) = \sum_y \int_z q(y,z|s,s) \ln\left(\frac{p(x,y,z|s)}{q(y,z|x,s)}\right) dz \quad (4)$$

and:

$$D_{KL}(q\|p) = -\sum_y \int_z q(y,z|x,s) \ln\left(\frac{p(y,z|x,s)}{q(y,z|x,s)}\right) dz \quad (5)$$

Since $D_{KL}(q\|p)$ is always non-negative, $\mathcal{L}(q)$ may be used as a lower bound on the data likelihood, known as the evidence lower bound (ELBO). Optimizing this bound $\mathcal{L}(q)$ equivalently maximizes data likelihood and minimizes $D_{KL}(q\|p)$. Substituting the factorization of $p(x, y, z|s)$ and $q(y, z \oplus x, s)$ into Equation (4) gives:

$$\mathcal{L} = \sum_y \int_z q(y \mid x, s) q(z \mid x) \ln\left(\frac{p(y \mid s)p(z \mid y)p(x \mid z)}{q(y \mid x, s)q(z \mid x)}\right) dz \quad (6)$$

which equals:

$\int_z q(z|x) \ln p(x|z) dz - D_{KL}(q(x|x,s)\|p(y|s))$ $-\Sigma_y q(y|x,s) D_{KL}(q(z|x)\|p(z|y))$ \quad (7)

The system may implement $p(y|s)$, $p(x|z)$, and $q(z|x)$ as neural networks and implement $p(z|y)$ as a linear function mapping a one-of-K representation of y to mean and variance of z clusters. While $p(x|z)$ and $q(z|x)$ are small, fully connected networks, $p(y|s)$ includes a convolutional stage that extracts features from the rasterized scene input. The encoder $q(z|x)$, in some examples, learns both means and variances of z as a function of x, while the decoder $p(x|z)$ learns means only and the output distribution over x is defined as a Gaussian with learned mean and identity covariance, though the model could be easily adapted to learn the output variance as well.

The distribution $q(y|x, s)$ need not be represented as a neural network, since this distribution can be directly computed using the other distributions. The model and factorization may follow a mean-field approximation because the variational approximation for neither y nor z depends on the other. Therefore, following a general result obtains:

$$q(y \mid x,) = \frac{p(y \mid s)\exp(-H(q(z \mid x), p(z \mid y)))}{\sum_y p(y \mid s)\exp(-H(q(z \mid x), p(z \mid y)))} \quad (8)$$

where $H(q(z|x), p(z|y))$ is the cross entropy between $q(z|x)$ and $p(z|y)$, which can be computed analytically since both distributions are Gaussian. This expression provides the intuitive result that probabilistic assignment of clusters is determined by proximity between the encoding given by $q(z|x)$ and the cluster location given by $p(z|y)$. Computing $q(y|x, s)$ in this way is analogous to computing the E-step in the expectation maximization algorithm.

For the purposes of optimizing this expression in the context of stochastic gradient descent, the integral in the first term of Equation (7) may be approximated with a Monte Carlo estimate using a single sample, leading to the objective function:

$\mathcal{L} \approx \ln(p|x|\tilde{z}) - D_{KL}(q(y|x,s)\|p(y|s))$ $-\Sigma_y q(y|x,s) D_{KL}(q(z|x)\|p(z|y))$ \quad (9)

where $\tilde{z}$ is a sample drawn from $q(z|x)$. At each step, the system may determine or compute $q(y|x, s)$ using Equation (8) with the current model parameter values and hold that distribution fixed while optimizing the other distributions.

Figure 3:
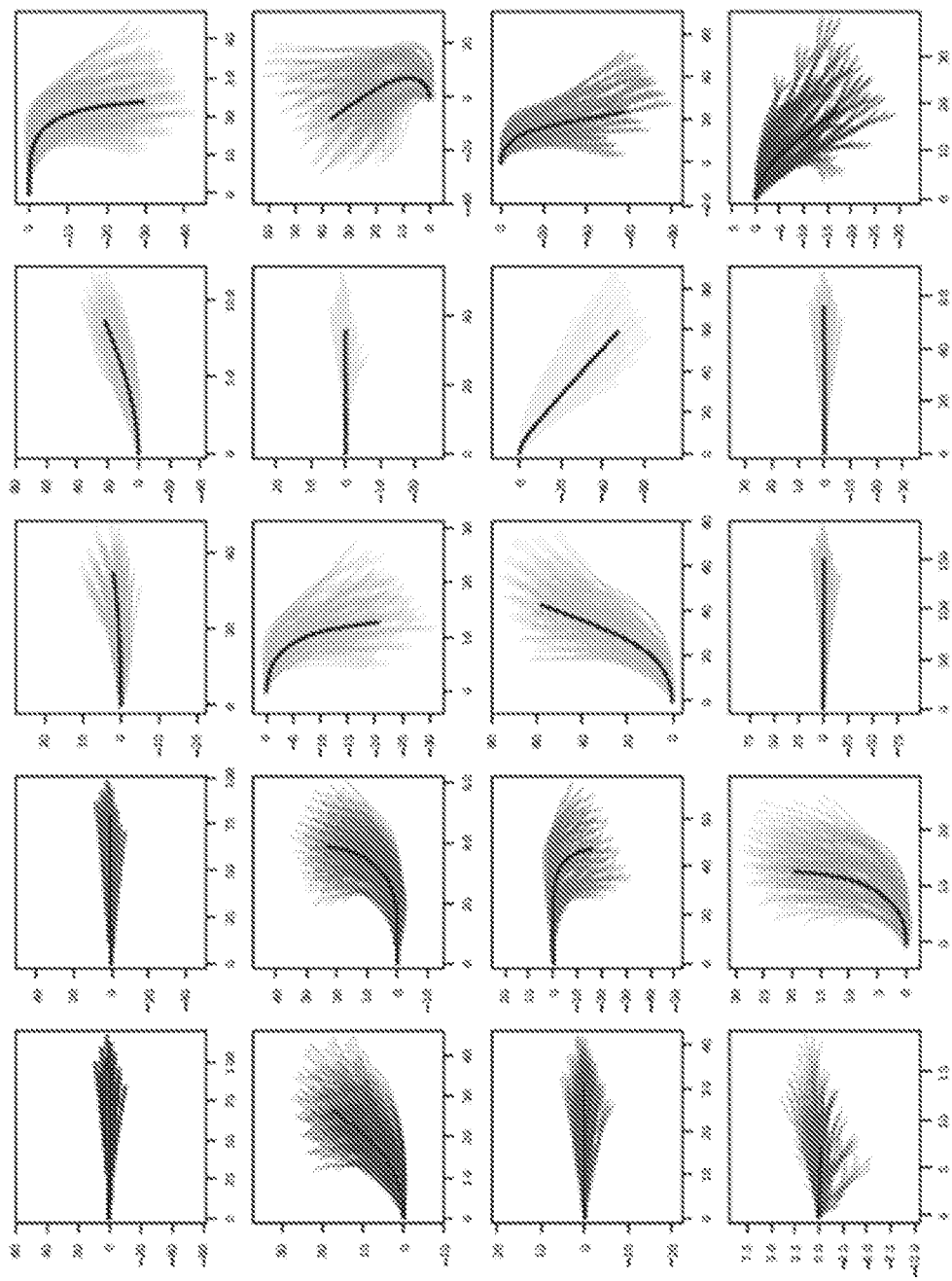
FIG. 3 is are schematic views of learned action distributions.
Figure 4:
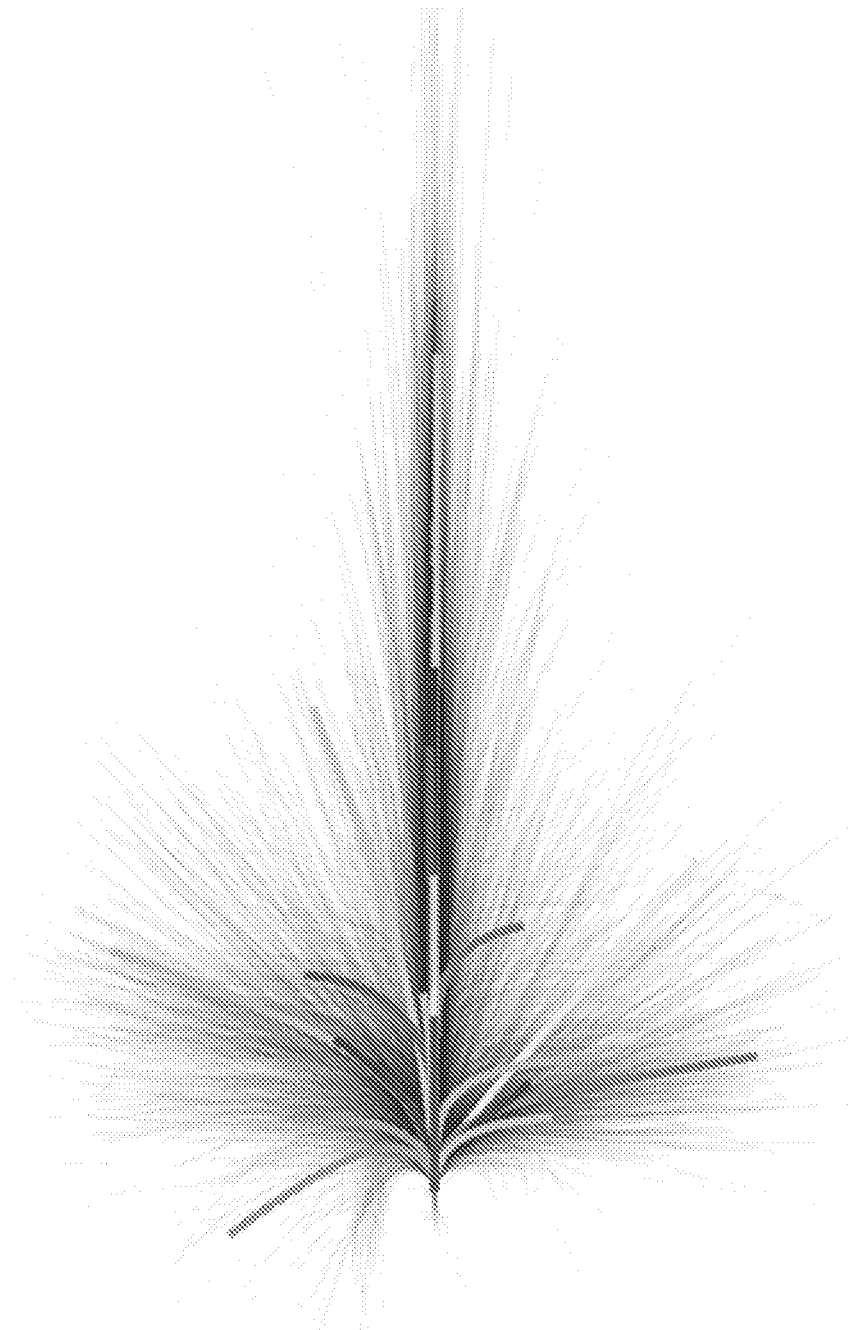
FIG. 4 is a schematic view of learned action means decoded into trajectory space and overlaid on trajectory samples.

FIG. 3 illustrates a set of actions learned using this method. Here, the model has produced a diverse range of actions, both turning and straight, that differ in shape and scale. While the mean of each distribution (illustrated as a dark black line) shows the overall characteristic of the action, the distribution around it (illustrated as the lighter lines around the black line) shows the variability within each action type. The mean is illustrated by decoding the mean value of each GMM cluster component, while the distributions are illustrated by decoding points that are offset from the mean by $\pm 1\sigma$ in each latent dimension. Notably, these samples are generated in a single deterministic evaluation of the decoder on a tensor of sigma points without the need for random sampling. The axes of FIG. 3 represent distance in meters. FIG. 4 illustrates exemplary means of each action distribution overlaid on trajectory samples from a test dataset, showing strong qualitative agreement between the learned action representation and the types of trajectories in the dataset. That is, FIG. 4 illustrates learned action means decoded into trajectory space, overlaid on trajectory samples from a dataset.

Thus, the model learns a set of representative actions and predicts the discrete distribution over action selection given a particular scenario. However, each action is represented as a distribution reflecting the variability among similar maneuvers. As a result, the action distribution is not directly applicable for making accurate motion predictions. In principle, the likelihood of any given trajectory in a given scenario may be evaluated by:

$p(x|s) = \Sigma_y p(y|s) \int_z p(z|y) p(x|z) dz$ \quad (10)

Alternatively, and perhaps more practically, the set of likely action distributions in a given scenario could be generated by first evaluating $p(y|s)$ and then decoding the GMM component (e.g., mean and $\pm n\sigma$) corresponding to values of the discrete action choices y that were assigned high probability.

However, in the model described herein (i.e., FIG. 2), the distribution over the continuous latent variable z does not depend on scenario s except through the choice of y. In reality, the value of z should depend strongly on s because it is the geometric structure of the road and surrounding agents in the scenario that determine which actions are both feasible and likely. Small variations in the value of z within a given action distribution make the difference between a turn into the correct lane and a turn into oncoming traffic. Therefore, it is advantageous to introduce a dependency on s in the prediction of the continuous latent variable (e.g., $p(z|y, s)$) or the decoder (e.g., $p(x|z, s)$).

However, since the scenario s contains sufficient information to accurately predict the continuous-valued latent variable z or the output trajectory x directly without the use of a discrete action choice, introducing s as a dependency in these distributions undermines and even prevents the model from effectively learning a multimodal action representation. It is noted that a model whose latent variable prediction has access to the scenario (e.g., $p(z|y, s)$) will simply bypass the discrete variable altogether, resulting in a very small number of non-degenerate clusters and one dominant cluster whose distribution spans the full continuum of actions. Similarly, in a model whose decoder has access to the scenario (e.g., $p(x|z, s)$), the geometric shape and semantic role of each discrete action become so shifted depending on the scenario as to lose any consistent identifiable meaning. In order to achieve effective clustering of data into representative action distributions, the learned structure must be in the latent space that does not shift with scenario s and the discrete variable y must be the sole pathway of scenario information in the generative model to learn non-degenerate predictions of y based on s.

Nevertheless, the prediction of the continuous latent variable z should be refined in order to make accurate predictions. The posterior $p(z|y, s)$ can be decoded to generate the distribution of trajectories for a specific discrete action choice, conditioned on the scenario. The methods of variational inference are well suited to estimate posteriors and implementations herein approximate the true posterior p(z|y, s) with a variational approximation q(z|y, s), effectively serving as a separate encoder.

Optionally, the model illustrated in FIG. 2 may be modified by replacing the existing encoder q(z|x) with a different encoder q(z|y, s). However, as noted above, such a model would simply bypass the use of the discrete variable y and simply predict z directly based on s. Therefore, optimally the structure illustrated in FIG. 2 is maintained, but two options that build upon that structure may be further explored. The first option is to train an alternate encoder for the original model, and the second option is to extend the original model to create a larger unified model that includes two different encoders, jointly training all of the desired distributions.

Figure 5:
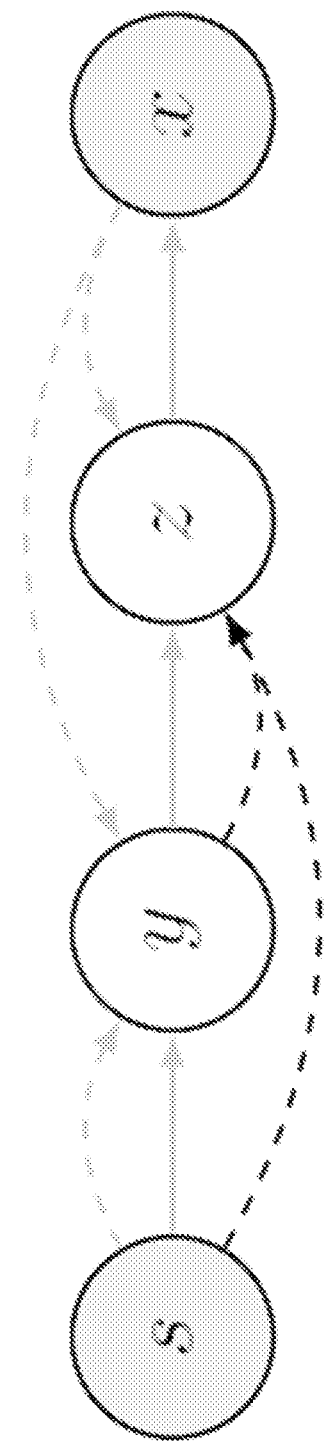
FIG. 5 is a schematic view of another graphical model that includes an alternate encoder.

A first implementation includes learning and fixing in place the distributions in the original model, then training a separate encoder q(z|y, s) using a variant of the original objective function (7):

$$\mathcal{L} = \sum_y \int_z q(y \mid x, s) q(z \mid y, s) \ln\left(\frac{p(y \mid s) p(z \mid y) p(x \mid z)}{q(y \mid x, s) q(z \mid y, s)}\right) dz \quad (11)$$

$$= \sum_y q(y \mid x, s) \left[\int_z q(z \mid y, s) \ln p(x \mid z) dz\right.$$

$$\left. -D_{KL}(q(z \mid y, s) \| p(z \mid y)) \right] - D_{KL}(q(y \mid x, s) \| p(y \mid s)) \quad (12)$$

$$\approx \sum_y q(y \mid x, s) [\ln p(x \mid \tilde{z}) - D_{KL}(q(z \mid y, s) \| p(z \mid y))] \quad (13)$$

where in the final approximation, $\tilde{z}$ is sampled from q(z|y, s) (not q(z|x)) separately for each value of y, and where the final term from (12) is dropped with the assumption that q(y|x, s) and p(y|s) are both known and fixed. The objective is to train q(z|y, s) only, and it may be assumed that all other terms in this function have already been learned and are fixed. FIG. 5 illustrates this alternative encoder.

This is a VAE-like objective function because it contains the two terms typically found in a conventional VAE objective function: reconstruction of the input based on a sample drawn from the variational posterior q(z|y, s), and the KL divergence between the variational posterior and the prior. The discrete distribution q(y|x, s) is relied upon to correctly attribute each data sample to the appropriate discrete action, which enables q(z|y, s) to learn to predict different maneuvers (e.g., "go straight" vs. "turn left") from the same scenario s. Implementations herein implement q(z|y,s) as a collection of neural networks, $q_1(z|s), \ldots, q_K(z|s)$, one for each value of $y \in 1, \ldots, K$.

Although this method is functional, one particular downside of learning q(z|y,s) apart from the rest of the model is that the convolutional stage that extracts scene features to predict p(y|s) may not learn features that are optimally tuned to predicting q(z|y, s). Therefore, it may be necessary to train a separate convolutional stage specifically for q(z|y, s) or interleave both training phases to achieve the best results. Alternatively, a single unified model that jointly learns the representative action distributions, discrete action prediction, and the posterior q(z|y, s), enabling accurate motion predictions may be used.

The model of FIG. 2 is capable of learning a set of representative action distributions and a discrete action predictor. In order to simultaneously learn a second posterior distribution q(z|y, s) that tailors each action distribution to a particular scenario, implementations herein include simultaneously extending the model with dual outputs, thereby enabling the model to learn two different posterior distributions (encoders). This unified model is exemplified in FIG. 6. This unified model contains the original model (FIG. 2) in its entirety and is additionally augmented with a second instance of the continuous latent variable, which is denoted z' and a second instance of the trajectory output variable, which is denoted x'. Using the definition p(z'|y)≡p(z|y) and p(x'|z')≡p(x|z), the same GMM components and decoder are shared between both branches of the model.

This model reflects the following factorization of generative and variational distributions:

$$p(x,x',y,z,z'|s) = p(y|s)p(z|y)p(x|z)p(z'|y)p(x'|z') \quad (14)$$

$$q(y,z,z'|x,s) = q(y|x,s)q(z|x)q(z|y,s) \quad (15)$$

Following a derivation analogous to Equation (6) and Equation (7) and using shorthand for each distribution to simplify notation, the following expression for the unified objective function based on the ELBO is found:

$$\mathcal{L}_{unified} = \sum_y \int_z \int_{z'} q_y q_z q_{z'} \ln\left\{\frac{p_y p_z p_x p_{z'} p_{x'}}{q_y q_z q_{z'}}\right\} dz dz' \quad (16)$$

$$\approx \ln p(x|\tilde{z}) + \Sigma_y q_y \ln p(x'|\tilde{z}') - D_{KL}(q_y \| p_y)$$

$$-\Sigma_y q_y [D_{KL}(q_z \| p_z) + D_{KL}(q_{z'} \| p_{z'})] \quad (17)$$

where $\tilde{z}$ is sampled from $q_z$ and $\tilde{z}'$ is sampled from $q_{z'}$. Inspection of the terms in this expression demonstrates that this model consists exactly of the terms from Equation (9) and the initial method proposed to learn a dual encoder in Equation (13), seamlessly unifying both objectives.

One important distinction between this unified model and the original model of FIG. 2 is that the latent variables no longer follow the mean-field approximation due to the dependency of q(z'|y, s) on y. However, the same method may be followed to derive the following expression for q(y|x, s) in the unified model.

Again, utilizing shorthand to simplify notation:

$$q_y = \frac{p_y \exp(-H(q_z, p_z) - D_{KL}(q_{z'} \| p_{z'}))}{\sum_y p_y \exp(-H(q_z, p_z) - D_{KL}(q_{z'} \| p_{z'}))} \quad (18)$$

This expression differs from Equation (8) only in the appearance of the $-D_{KL}(q_{z'} \| p_{z'})$ term, which reflects that the probability of a given data point belonging to a given cluster also depends on the proximity between the encoding q(z'|y, s) and the cluster location p(z'|y).

Figure 7A:
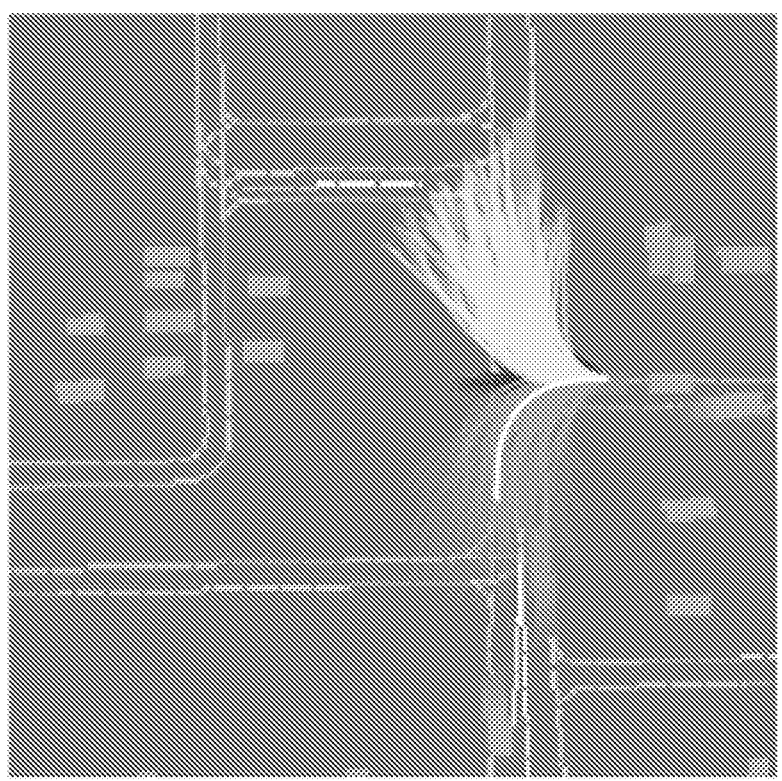
FIGS. 7A and 7B are schematic views of inferred action distributions.
Figure 7B:

Having learned the full unified model, the system may make motion predictions by first evaluating p(y|s) to determine the likely action choices, evaluating q(z|y, s) for each of the likely action choices, and decoding those distributions with p(x|z) to generate trajectory distributions. The probability of any given trajectory x can be estimated by evaluating:

$$p(x|s) = \Sigma_y p(y|s) \int_z q(z|y,s) p(x|z) dz \quad (19)$$

which is simply Equation (10) where p(z|y) has been replaced with q(z|y, s). FIGS. 7A and 7B illustrate the difference between the generic action distributions represented by GMM components p(z|y) and the posterior estimates of action distributions, conditioned on the scenario, given by q(z|y, s). The posterior estimate of the continuous latent variable z dramatically narrows the distribution from the original GMM component to a much smaller region of latent space that is likely given the scenario.

The derivation of q(y|x, s) for the model illustrated in FIG. 2 follows a derivation for the case of mean field approximation. To simplify notation, the provided equations use shorthand such as $q_y$ to refer to q(y|x, s). Other distributions will be denoted similarly. It begins by writing the ELBO and rearranging terms to arrive at an expression of KL divergence between $q_y$ and another distribution. Because the goal is to find the optimal value of $q_y$ given the current parameters of all other distributions, terms that are constant with respect to $q_y$ are dropped.

$$\mathcal{L} = \sum_y \int_z q_y q_z \{\ln(p_x p_y p_z) - \ln q_z - \ln q_y\} dz \quad (20)$$

$$= \sum_y q_y \left\{ \int_z q_z \ln(p_x p_y p_z) dz \right\} - \sum_y q_y \ln q_y + const \quad (21)$$

$$= -D_{KL}(q_y \| \tilde{p}) \quad (22)$$

where we have defined ln $\tilde{p}$ as:

$$\ln \tilde{p} = \int_z q_z \ln(p_x p_y p_z) dz + const \quad (23)$$

$\mathcal{L}$ is optimized with respect to $q_z$ when $D_{KL}(q_y \| \tilde{p})=0$, which gives:

$$\ln q^*_y = \ln \tilde{p} = \int_z q_z \ln(p_x p_y p_z) dz + const \quad (24)$$

Expanding the terms in the integral of Equation (22) gives:

$$\ln q^*_y = \int_z q_z \ln p_y dz + \int_z q_z \ln p_z dz + \int_z q_z \ln p_x dz + const \quad (25)$$

$$= \ln p_y - H(q_z, p_z) + const \quad (26)$$

where it is observed that the third term in Equation (25) does not depend on $q_y$ and so it is combined with the constant, which can be dropped and inferred through normalization to give the result in Equation (8).

$$q^*_y = \frac{p_y \exp(-H(q_z, p_z))}{\sum_y p_y \exp(-H(q_z, p_z))} \quad (27)$$

Figure 6:
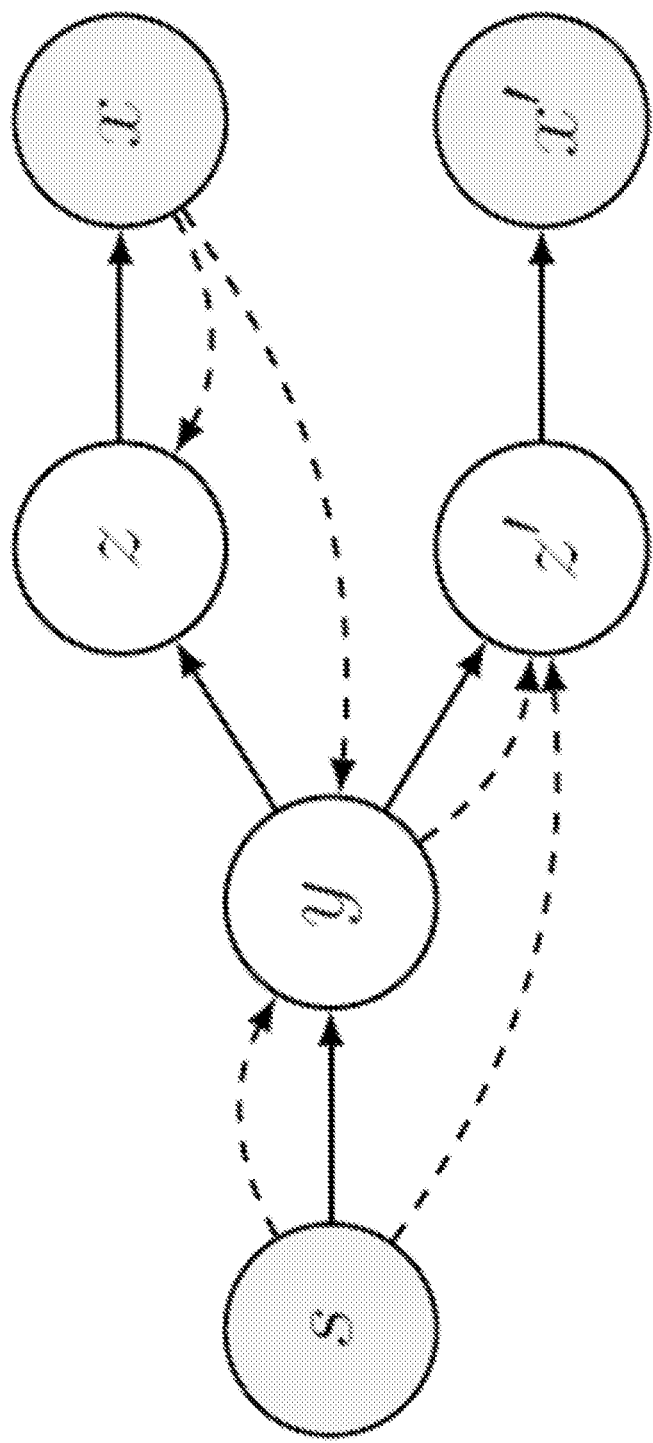
FIG. 6 is a schematic view of a unified model that includes the model of FIG. 2.

The derivation for expression for q(y|x, s) in the unified model illustrated in FIG. 6 is somewhat more involved due to the fact that the latent variables in the unified model do not adhere to the mean field approximation. Nevertheless, the derivation above can be extended to arrive at the expression in Equation (18). Again beginning with the ELBO, the terms that are constant with respect to $q_y$ are collected and rearranged to arrive at an expression of KL divergence:

$$\mathcal{L}_{unified} = \sum_y \int_z \int_{z'} q_y q_z q_{z'} \{\ln(p_x p_{x'} p_y p_z p_{z'})$$

$$- \ln q_z - \ln q_{z'} - \ln q_y\} dz' dz \quad (28)$$

$$= \sum_y q_y \left\{ \int_z \int_{z'} q_z q_{z'} \ln(p_x p_{x'} p_y p_z p_{z'}) dz' dz \right.$$

$$\left. - \int_{z'} q_{z'} \ln q_{z'} dz' \right\} - \sum_y q_y \ln q_y + const \quad (29)$$

$$= -D_{KL}(y_y \| \tilde{p}_{unified}) \quad (30)$$

where we have defined ln $\tilde{p}_{unified}$ as:

$$\ln \tilde{p}_{unified} = \int_z \int_{z'} q_z q_{z'} \ln(p_x p_{x'} p_y p_z p_{z'}) dz' dz$$

$$- \int_z q_z \ln q_z dz' + const \quad (31)$$

It is observed again that $\mathcal{L}_{unified}$ is optimized with respect to $q_y$ when $D_{KL}(y_y \| \tilde{p}_{unified})=0$. Expanding and combining the terms in Equation (31) and collecting those that are constant with respect to $q_y$ gives:

$$\ln q^*_y = \ln p_y - H(q_z, p_z) - D_{KL}(q_{z'} \| p_{z'}) + const \quad (32)$$

Finally, inferring the constant terms through normalization arrives at the results in Equation (18).

$$q^*_y = \frac{p_y \exp(-H(q_z, p_z) - D_{KL}(q_{z'} \| p_{z'}))}{\sum_y p_y \exp(-H(q_z, p_z) - D_{KL}(q_{z'} \| p_{z'}))} \quad (33)$$

For autonomous vehicles suitable for deployment with the system, an occupant of the vehicle may, under particular circumstances, be desired or required to take over operation/control of the vehicle and drive the vehicle so as to avoid potential hazard for as long as the autonomous system relinquishes such control or driving. Such an occupant of the vehicle thus becomes the driver of the autonomous vehicle. As used herein, the term "driver" refers to such an occupant, even when that occupant is not actually driving the vehicle but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides, and rear of the vehicle, multiple radar sensors deployed at the front, sides, and rear of the vehicle, and/or multiple lidar sensors deployed at the front, sides, and rear of the vehicle. Typically, such an autonomous vehicle will also have wireless two way communication with other vehicles or infrastructure, such as via a car2car (V2V) or car2x (i.e., car to infrastructure) communication system.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties) and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels or at least three million photosensor elements or pixels or at least five million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties.

The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The system may utilize sensors, such as radar or lidar sensors or the like, to detect presence of and/or range to other vehicles and objects at the intersection. The sensing system may utilize aspects of the systems described in U.S. Pat. Nos. 9,753,121; 9,689,967; 9,599,702; 9,575,160; 9,146,898; 9,036,026; 8,027,029; 8,013,780; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, the vehicular vision system comprising:

a forward-viewing camera disposed at a vehicle equipped with the vehicular vision system and viewing at least forward of the equipped vehicle, the camera capturing image data;

wherein the forward-viewing camera comprises a CMOS imaging array, and wherein the CMOS imaging array comprises at least one million photosensors arranged in rows and columns;

an electronic control unit (ECU) comprising electronic circuitry and associated software;

wherein the electronic circuitry of the ECU comprises an image processor for processing image data captured by the forward-viewing camera;

wherein the vehicular vision system, responsive to processing at the ECU of image data captured by the forward-viewing camera, detects a target vehicle forward of the equipped vehicle;

wherein the vehicular vision system, responsive to detecting the target vehicle, predicts, using a machine learning model, a probability for each action of a determined set of actions, and wherein each action in the determined set of actions represents a determined potential action by the target vehicle, and wherein the machine learning model comprises at least one discrete latent variable and at least one continuous latent variable; and wherein the vehicular vision system at least in part controls the equipped vehicle based at least in part on the predicted probability for each action of the determined set of actions.

2. The vehicular vision system of claim 1, wherein each action of the determined set of actions represents a continuous distribution of trajectories.

3. The vehicular vision system of claim 1, wherein the machine learning model is trained using a self-supervised technique.

4. The vehicular vision system of claim 3, wherein the machine learning model is trained to learn the determined set of actions using a dataset comprising trajectory-scenario pairs.

5. The vehicular vision system of claim 1, wherein the machine learning model comprises a Gaussian mixture model comprising the at least one discrete latent variable and the at least one continuous latent variable.

6. The vehicular vision system of claim 1, wherein the machine learning model comprises a plurality of neural networks.

7. The vehicular vision system of claim 1, wherein the vehicular vision system, responsive to predicting the probability for each action, predicts, using the machine learning model, a discrete distribution of at least one action of the determined set of actions, wherein the discrete distribution models a variability of the at least one action.

8. The vehicular vision system of claim 7, wherein the predicted probability for each action comprises a discrete distribution over the determined set of actions.

9. The vehicular vision system of claim 7, wherein the machine learning model tailors the discrete distribution of the at least one action of the determined set of actions based on a current scenario.

10. The vehicular vision system of claim 7, wherein the discrete distribution comprises a continuous distribution of potential trajectories for the target vehicle to follow when performing the at least one action.

11. The vehicular vision system of claim 1, wherein the determined set of actions comprises at least one turning action and at least one moving straight action.

12. The vehicular vision system of claim 1, wherein the machine learning model predicts the probability for each action in the determined set of actions based at least in part on (i) road geometry around the target vehicle and (ii) presence of other vehicles.

13. The vehicular vision system of claim 1, wherein the forward-viewing camera is disposed at an in-cabin side of a windshield of the vehicle and views through the windshield and at least forward of the vehicle.

14. A vehicular vision system, the vehicular vision system comprising:
   a forward-viewing camera disposed at a vehicle equipped with the vehicular vision system and viewing at least forward of the equipped vehicle, the camera capturing image data;
   wherein the forward-viewing camera comprises a CMOS imaging array, and wherein the CMOS imaging array comprises at least one million photosensors arranged in rows and columns;
   an electronic control unit (ECU) comprising electronic circuitry and associated software;
   wherein the electronic circuitry of the ECU comprises an image processor for processing image data captured by the forward-viewing camera;
   wherein the vehicular vision system, responsive to processing at the ECU of image data captured by the forward-viewing camera, detects a target vehicle forward of the equipped vehicle;
   wherein the vehicular vision system, responsive to detecting the target vehicle, predicts, using a machine learning model, a probability for each action of a determined set of actions, and wherein each action in the determined set of actions represents a determined potential action by the target vehicle, and wherein the machine learning model comprises at least one discrete latent variable and at least one continuous latent variable;
   wherein the vehicular vision system, responsive to predicting the probability for each action, predicts, using the machine learning model, a discrete distribution of at least one action of the determined set of actions, and wherein the discrete distribution models a variability of the at least one action, and wherein the predicted probability for each action comprises a discrete distribution over the determined set of actions, and wherein the machine learning model tailors the discrete distribution of the at least one action of the determined set of actions based on a current scenario; and
   wherein the vehicular vision system at least in part controls the equipped vehicle based at least in part on the predicted probability for each action of the determined set of actions.

15. The vehicular vision system of claim 14, wherein the machine learning model is trained using a self-supervised technique.

16. The vehicular vision system of claim 15, wherein the machine learning model is trained to learn the determined set of actions using a dataset comprising trajectory-scenario pairs.

17. The vehicular vision system of claim 14, wherein the machine learning model comprises a Gaussian mixture model comprising the at least one discrete latent variable and the at least one continuous latent variable.

18. The vehicular vision system of claim 14, wherein the machine learning model comprises a plurality of neural networks.

19. A vehicular vision system, the vehicular vision system comprising:
   a forward-viewing camera disposed at a vehicle equipped with the vehicular vision system and viewing at least forward of the equipped vehicle, the camera capturing image data;
   wherein the forward-viewing camera comprises a CMOS imaging array, and wherein the CMOS imaging array comprises at least one million photosensors arranged in rows and columns;
   an electronic control unit (ECU) comprising electronic circuitry and associated software;
   wherein the electronic circuitry of the ECU comprises an image processor for processing image data captured by the forward-viewing camera;
   wherein the vehicular vision system, responsive to processing at the ECU of image data captured by the forward-viewing camera, detects a target vehicle forward of the equipped vehicle;
   wherein the vehicular vision system, responsive to detecting the target vehicle, predicts, using a machine learning model, a probability for each action of a determined set of actions, and wherein each action in the determined set of actions represents a determined potential action by the target vehicle, and wherein the machine learning model comprises at least one discrete latent variable and at least one continuous latent variable;
   wherein the determined set of actions comprises at least one turning action and at least one moving straight action;
   wherein the machine learning model predicts the probability for each action in the determined set of actions based at least in part on (i) road geometry around the target vehicle and (ii) presence of other vehicles; and
   wherein the vehicular vision system at least in part controls the equipped vehicle based at least in part on the predicted probability for each action of the determined set of actions.

20. The vehicular vision system of claim 19, wherein the forward-viewing camera is disposed at an in-cabin side of a windshield of the vehicle and views through the windshield and at least forward of the vehicle.

21. The vehicular vision system of claim 19, wherein each action of the determined set of actions represents a continuous distribution of trajectories.

22. The vehicular vision system of claim 19, wherein the machine learning model is trained to learn the determined set of actions using a dataset comprising trajectory-scenario pairs.

* * * * *